(12) United States Patent
Mohamed Ghazzali et al.

(10) Patent No.: US 11,428,542 B2
(45) Date of Patent: Aug. 30, 2022

(54) OPTICAL METER READER APPARATUS, SYSTEM AND METHOD FOR DATA COLLECTION

(71) Applicant: KING ABDULLAH UNIVERSITY OF SCIENCE AND TECHNOLOGY, Thuwal (SA)

(72) Inventors: Raeece Naeem Mohamed Ghazzali, Thuwal (SA); Prabhu Murugesan, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/964,775

(22) PCT Filed: Feb. 5, 2019

(86) PCT No.: PCT/IB2019/050921
§ 371 (c)(1),
(2) Date: Jul. 24, 2020

(87) PCT Pub. No.: WO2019/162785
PCT Pub. Date: Aug. 29, 2019

(65) Prior Publication Data
US 2021/0055127 A1     Feb. 25, 2021

Related U.S. Application Data

(60) Provisional application No. 62/635,086, filed on Feb. 26, 2018.

(51) Int. Cl.
*G01D 4/00* (2006.01)
*G06K 7/00* (2006.01)

(52) U.S. Cl.
CPC .............. *G01D 4/008* (2013.01); *G01D 4/004* (2013.01); *G06K 7/0008* (2013.01)

(58) Field of Classification Search
CPC .... A61B 5/14532; G01D 4/002; G01D 4/004; G01D 4/006; G01D 4/008; G01D 9/42;
(Continued)

(56) References Cited

U.S. PATENT DOCUMENTS 3,197,752 A * 7/1965 Rabinow ............... G01F 15/063
340/870.02
4,491,793 A * 1/1985 Germer .................... G01D 5/06
250/239

(Continued)

FOREIGN PATENT DOCUMENTS

EP      2680245 A1    1/2014
GB      2305333 A     4/1997
(Continued)

OTHER PUBLICATIONS

International Search Report in corresponding/related International Application No. PCT/IB2019/050921, dated May 6, 2019.
(Continued)

*Primary Examiner* — Stephen R Burgdorf
(74) *Attorney, Agent, or Firm* — Patent Portfolio Builders PLLC

(57) ABSTRACT

An optical meter reader apparatus for reading data from a meter includes a housing; a housing extension connected to the housing, the housing extension having a flat face; a first slot formed on the flat face; a second slot formed on the flat face; and an optical communication module located within the housing and the housing extension and configured to exchange information with the meter using infrared waves.

18 Claims, 11 Drawing Sheets

(58) Field of Classification Search
CPC .. G01R 22/063; G06F 1/1632; G06K 7/0008; G06K 7/0022; G07F 9/026; H04B 10/11; H04Q 9/00; Y04S 20/30
USPC .................................................. 340/870.02
See application file for complete search history.

(56) References Cited

U.S. PATENT DOCUMENTS

| | | | | |
|---|---|---|---|---|
| 4,783,623 | A * | 11/1988 | Edwards | G01R 11/16 324/156 |
| 5,014,213 | A * | 5/1991 | Edwards | G01R 21/133 324/116 |
| 5,590,179 | A * | 12/1996 | Shincovich | G01D 4/004 379/106.06 |
| 6,208,266 | B1 * | 3/2001 | Lyons | G08C 17/02 340/870.02 |
| 6,404,960 | B1 * | 6/2002 | Hibbs-Brenner | G02B 6/262 385/52 |
| 2002/0041237 | A1 | 4/2002 | Nathan | |
| 2002/0089802 | A1 * | 7/2002 | Beckwith | H02J 13/0017 361/63 |
| 2004/0061490 | A1 * | 4/2004 | Huber | G01R 22/065 324/156 |
| 2005/0104744 | A1 * | 5/2005 | Patterson | G01D 4/006 340/870.02 |
| 2012/0280833 | A1 * | 11/2012 | Jonsson | G06F 13/385 340/870.02 |
| 2016/0370204 | A1 * | 12/2016 | Spanier | G01D 4/002 |
| 2017/0125957 | A1 * | 5/2017 | Ejiri | H01R 13/642 |
| 2018/0052008 | A1 | 2/2018 | Maman et al. | |

FOREIGN PATENT DOCUMENTS

| | | | | |
|---|---|---|---|---|
| GB | 2462006 | A * | 1/2010 | ............ G01D 4/004 |
| WO | 2009055061 | A1 | 4/2009 | |

OTHER PUBLICATIONS

Written Opinion of the International Searching Authority in corresponding/related International Application No. PCT/B2019/050921, dated May 6, 2019.
Communication pursuant to Article 94(3) EPC in corresponding/related European Application No. 19709121.8, dated Nov. 17, 2021.

* cited by examiner

OPTICAL METER READER APPARATUS, SYSTEM AND METHOD FOR DATA COLLECTION

CROSS-REFERENCE TO RELATED APPLICATIONS

This application is a U.S. National Stage Application of International Application No. PCT/IB2019/050921, filed on Feb. 5, 2019, which claims priority to U.S. Provisional Patent Application No. 62/635,086, filed on Feb. 26, 2018, entitled "OPTICAL MAGNETIC COUPLER FOR UTILITY METERING WITH LONG RANGE RADIO COMMUNICATION," the disclosures of which are incorporated herein by reference in their entirety.

BACKGROUND

Technical Field

Embodiments of the subject matter disclosed herein generally relate to an optical meter reading apparatus that is used to collect data from a meter, and more specifically, to techniques and processes for attaching such an optical meter reading apparatus to a meter for reading information from the meter and transmitting the information, in a wireless manner, to a remote server.

Discussion of the Background

Utility providers, such as energy, water and gas companies, need to meter, for each customer, the amount of the product that is being delivered to that customer. Traditionally, the utility provider installs a metering device, usually called a meter, at the consumer's location and the meter is configured to measure and record the amount of product that is delivered to the consumer. However, the amount of product delivered to the consumer needs to be read on a monthly basis so that the utility can invoice accordingly the consumer. In a typical scenario, a person physically visits the consumer's location and manually reads the meter, i.e., the person reads a gauge of the meter and writes down in a logbook the value of the gauge. More sophisticated utilities provide the person physically reading the meter with a meter reader device that connects to a portable computing device. The person scans the meter with the meter reader device for collecting the data indicating the amount of the product consumed by the customer. The meter reader device transfers the data to the portable computing device for storage. When the person returns to the utility, the data is transferred from the portable computing device to the utility's server and the invoicing of the customer is generated.

This method is expensive, sometimes not reliable, and requires a person to physically visit the site of the customers. Automatic methods of reading a meter from a remote location are currently implemented using various technologies such as PLC (power line carrier), coaxial cable, telephone and radio frequency. However, these methods require than a reading device is permanently installed at the consumer's location and this device is connected through a physical wire to the meter for reading the information from the meter. Also, in many implementations, the reading device needs to have access to a telephone line or a coaxial cable, which is not always available.

Thus, there is a need for a method and meter reader that can be attached to the meter for as long as necessary, can read in a reliable way information from the meter, and can also transmit the information back to the utility without the intervention of a person.

SUMMARY

According to an embodiment, there is an optical meter reader apparatus for reading data from a meter. The optical meter reader apparatus includes a housing, a housing extension connected to the housing, the housing extension having a flat face, a first slot formed on the flat face, a second slot formed on the flat face, and an optical communication module located within the housing and the housing extension and configured to exchange information with the meter using infrared waves.

According to another embodiment, there is a system for reading information from a meter and transmitting the information to a server. The system includes a meter configured to estimate an amount of a product delivered by an utility throughout the meter, a coupling device attached to a face of the meter, and an optical meter reader apparatus for reading the information from the meter. The optical meter reader apparatus is detachably attached to the coupling device.

According to still another embodiment, there is a method for collecting and transmitting information from a meter. The method includes attaching a coupling device to the meter, attaching an optical meter reader apparatus to the coupling device, exchanging information embedded into infrared light between the meter and the optical meter reader apparatus, and transmitting in a wireless manner the information from the optical meter reader apparatus to a server. The coupling device includes one or more blocks and the optical meter reader apparatus includes one or more slots that accommodate the one or more blocks, respectively, so that the optical meter reader apparatus does not move relative to the meter.

BRIEF DESCRIPTON OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1A:
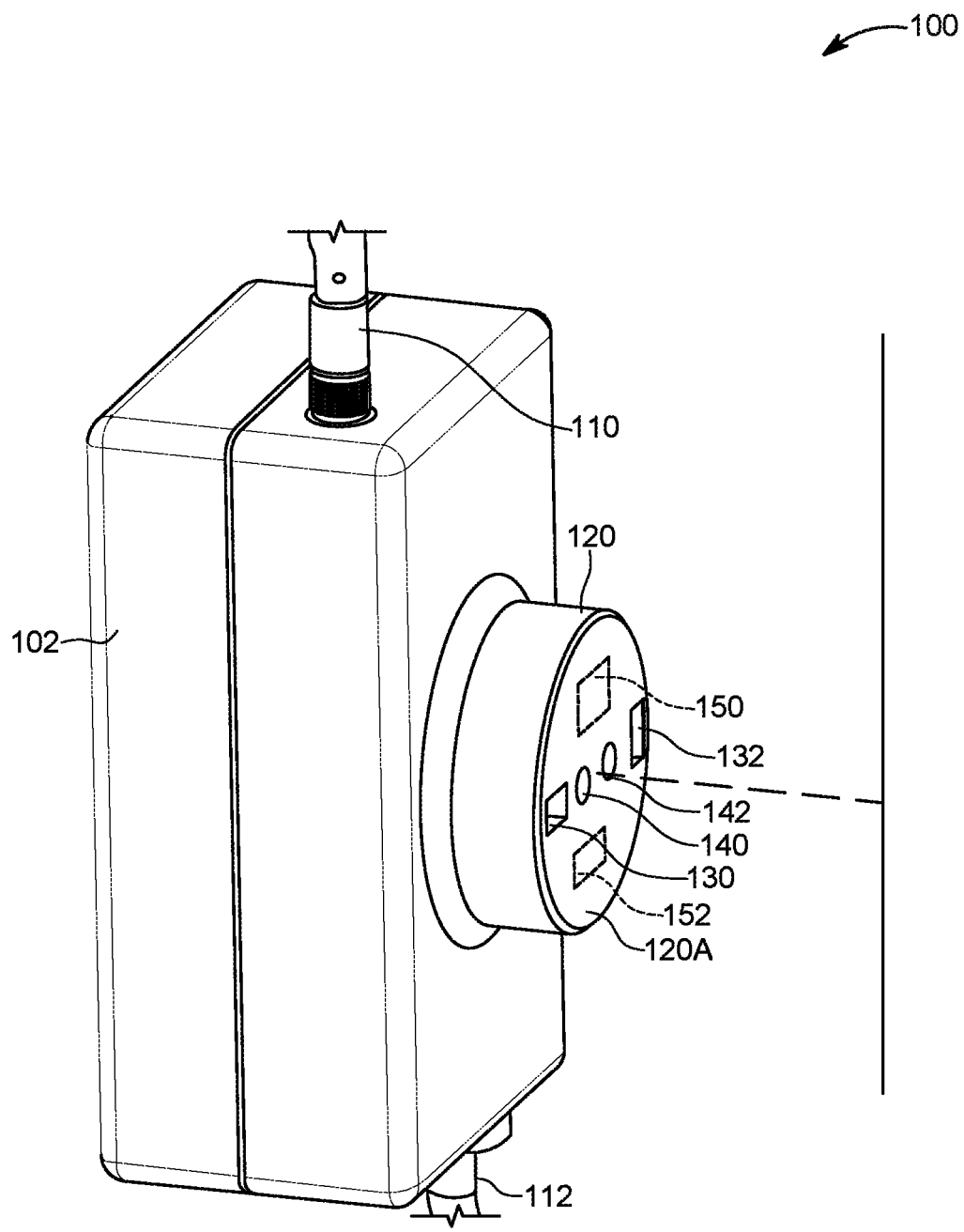
FIGS. 1A and 1B illustrate an optical meter reader apparatus that reads data using infrared light from a meter.

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an optical meter reader apparatus that can be attached on a more permanent basis to a meter. However, the embodiments discussed herein are not limited to attaching the optical meter reader to a meter.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Energy, water and gas meters have several different interfaces for communicating with an external reading device. One such interface is the optical port defined in IEC62056-21 and ANSI C12.18 Type II. The purpose of this optical port is to facilitate communication with the meter through infrared electromagnetic waves.

In one embodiment, an optical meter reader apparatus is temporarily attached to a coupling device that is in turn attached to the meter. The term "temporarily" is understood and defined in this application to mean for at least one billing cycle, where the billing cycle depends from utility to utility, but is usually about one month. Shorter or longer billing cycles may be used, but not shorter than one week. The optical meter reader apparatus includes an optical unit that communicates with the optical port of the meter. The optical meter reader apparatus reads the data from the meter through the optical port and transmits the data to the utility or a third party associated with the utility, via a wireless path. The wireless path may include one or more segments that use AM or FM waves, Bluetooth technology, wi-fi technology, or any other wireless technology. In one embodiment, there is no person that physically walks with a portable electronic device to the meter to read the data from the meter, but rather the optical meter reader apparatus automatically and independently communicates directly with a gate that is routing the information automatically and wirelessly to the utility. The gate may be installed at the customer's location, inside or outside the premises, or as a network of beacons in the neighborhood of the customer (e.g., on a pole, or another building).

As will be apparent from the embodiments discussed herein, the novel optical meter reader apparatus has at least one of the following advantages: (i) ease of alignment with the optical port of the meter is achieved by using vertical and/or horizontal slots (e.g., rectangular) which can be fitted with corresponding blocks on a coupling device attached to the meter in only one way such that the infrared transmitter and receivers are correctly aligned; the magnetic force established between the optical meter reader apparatus and the coupling device holds the optical meter reader apparatus attached to the blocks of the coupling device to permanently provide support so the optical meter reader apparatus does not move due to gravitational force or vibration; and a microcontroller, which is part of the optical meter reader apparatus, facilitates infrared communication with the meter and transmission of the metering data to the utility as modulated radio frequency signals.

According to an embodiment illustrated in FIGS. 1A and 1B, the optical meter reader apparatus 100 includes a housing 102 that encloses the electronics (to be discussed later) that reads the data from the meter. An antenna 110 (for example, RF antenna) may be attached to the outside of the housing 102. However, in one application, the antenna may be located partially or fully inside the housing. Also exiting the housing 102, there is a cable 112 that is configured to supply power to the electronics inside the housing. The cable 112 may be any type of cable and it may directly connect to the meter, for transferring electrical power from the meter to the optical meter reader apparatus. In one embodiment, the cable 112 may be plugged into a plug, if available, provided on the structure holding the meter.

Figure 1B:
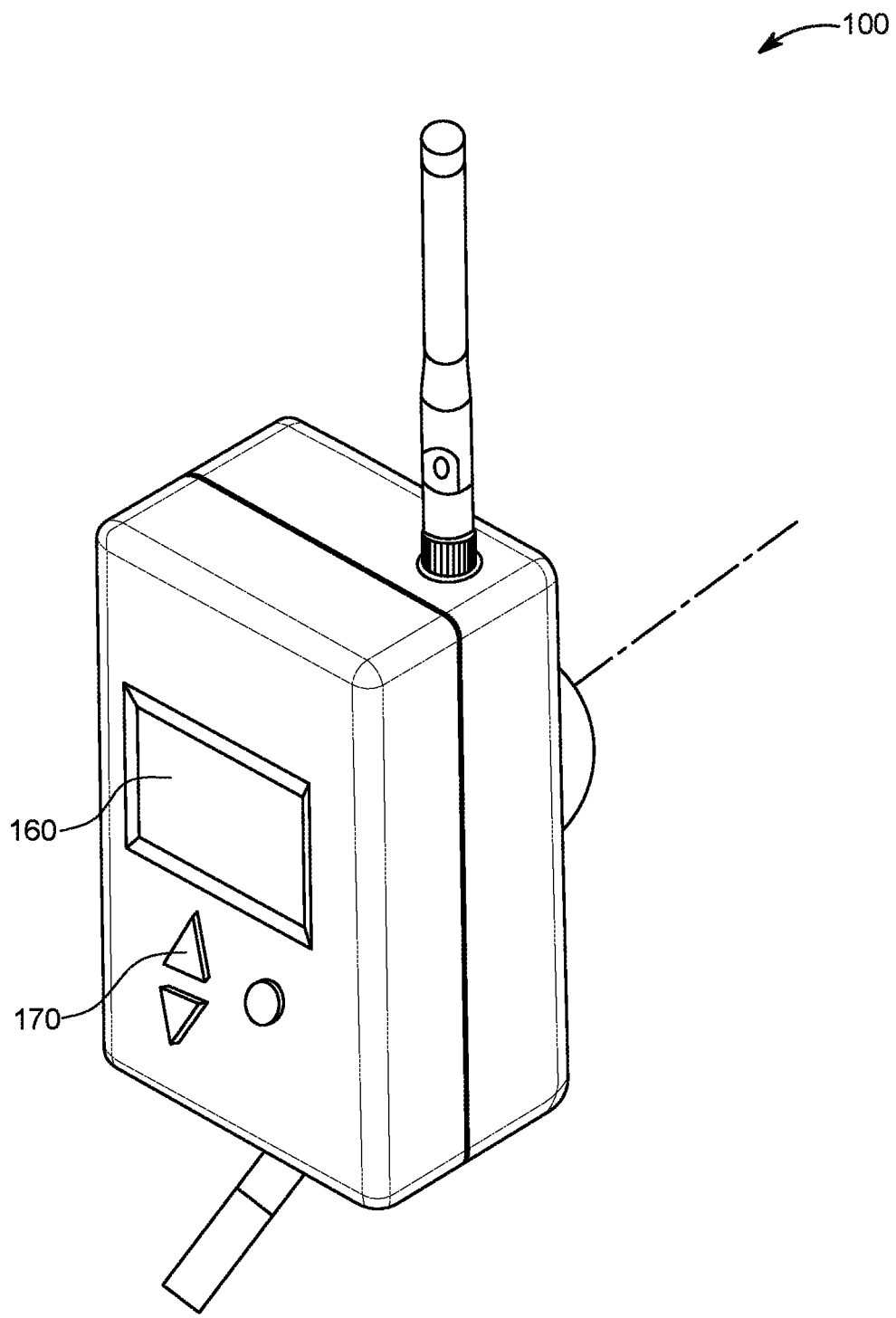

Housing 102 may have a housing extension 120 that projects out of the housing 102, as shown in FIG. 1A. While the housing 102 is shaped as a parallelepiped (other shapes may be possible, for example, cuboid), the housing extension 120 may be shaped as a cylinder (other shapes may be possible, for example, parallelepiped). On the face of the housing 102 that is opposite to the housing extension 120, it is possible to locate a screen 160 and one or more buttons 170 for introducing various commands or data to the optical meter reader apparatus 100, as shown in FIG. 1B. The screen 160 may show various data collected by the optical meter reader apparatus 100, or a status of the optical meter reader apparatus 100, or the status of a coupling between the optical meter reader apparatus 100 and the meter. Housing extension 120 has a flat face 120A that is configured to attach to a coupling device attached to the meter, as will be discussed later.

The flat face 120A is shown in FIG. 1A as having two slots 130 and 132 located diametrically opposed to each other. One skilled in the art would understand that in one application, only one slot may be formed on the face 120A. In another application, more than two slots may be formed. Two slots is considered to be the best number for maintaining the entire optical meter reader apparatus solidly attached to the coupling device of the meter. In this regard, note that if only one slot is present, the entire optical meter reader apparatus may slightly rotate relative to that slot, which may make the optical elements, to be discussed later, to be misaligned with the optical port of the meter.

Figure 2A:
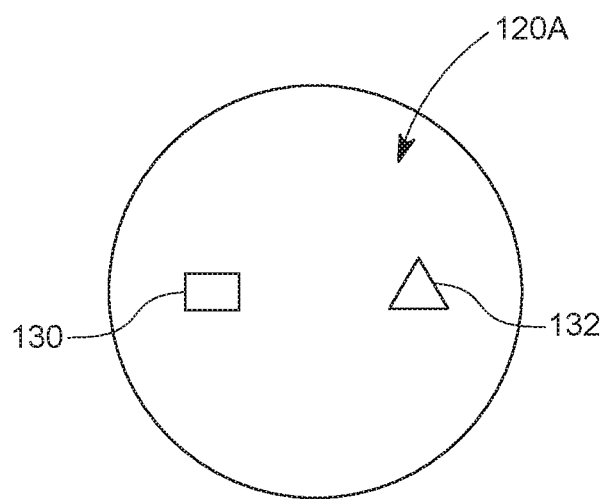
FIGS. 2A and 2B illustrate various slots that are formed in a flat face of the optical meter reader apparatus.
Figure 2B:
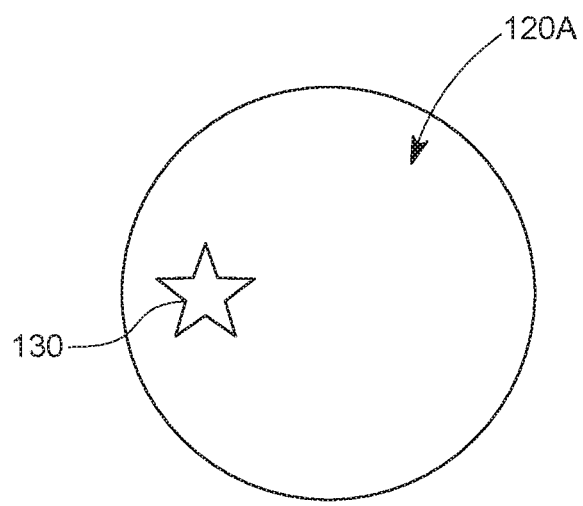

The two slots 130 and 132 are shown in the figure having a rectangular shape. However, they may have other shapes, for example, circle, square, star, hexagon, etc. In one application, a combination of two different shapes may be used, as illustrated in FIG. 2A (rectangle and triangle). In one application, a single slot may be used, for example a star, that would minimize a rotation of the optical meter reader apparatus relative to the meter, as shown in FIG. 2B. Returning to FIG. 1A, it is noted that to prevent the attachment of the optical meter reader apparatus to the meter in an undesired orientation, the two slots 130 and 132 are oriented in different positions, i.e., the first slot 130 is oriented longitudinally and the second slot 132 is oriented vertically. In this way, there is a single orientation of the optical meter reader apparatus that would fit the coupling device.

Figure 3:
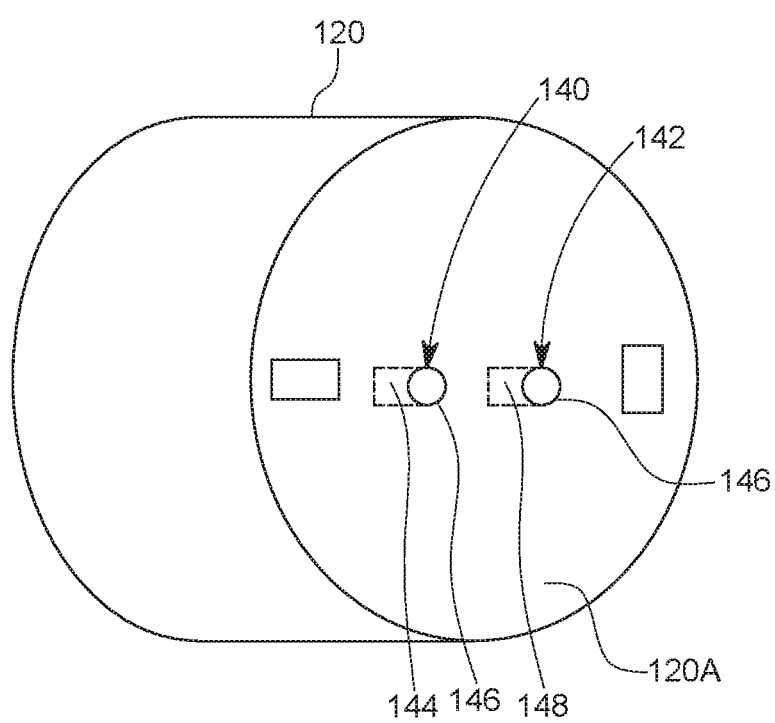
FIG. 3 illustrates the flat face and an optical communication module of the optical meter reader apparatus.

Two ports 140 and 142 are also located on the flat face 120A of the housing extension 120. The two ports 140 and 142 may be implemented in various ways. For example, the two ports 140 and 142 may be in fact an infrared light emitting diode and a photodiode, respectively, as illustrated in FIG. 1A. However, it is also possible, as illustrated in FIG. 3, that port 140 includes the infrared light emitting diode 144 that is covered with an infrared transparent material 146, and the port 142 includes the photodiode 148 and a corresponding infrared transparent material 146. In one application, the infrared transparent material 146 includes plastic.

Figure 4:
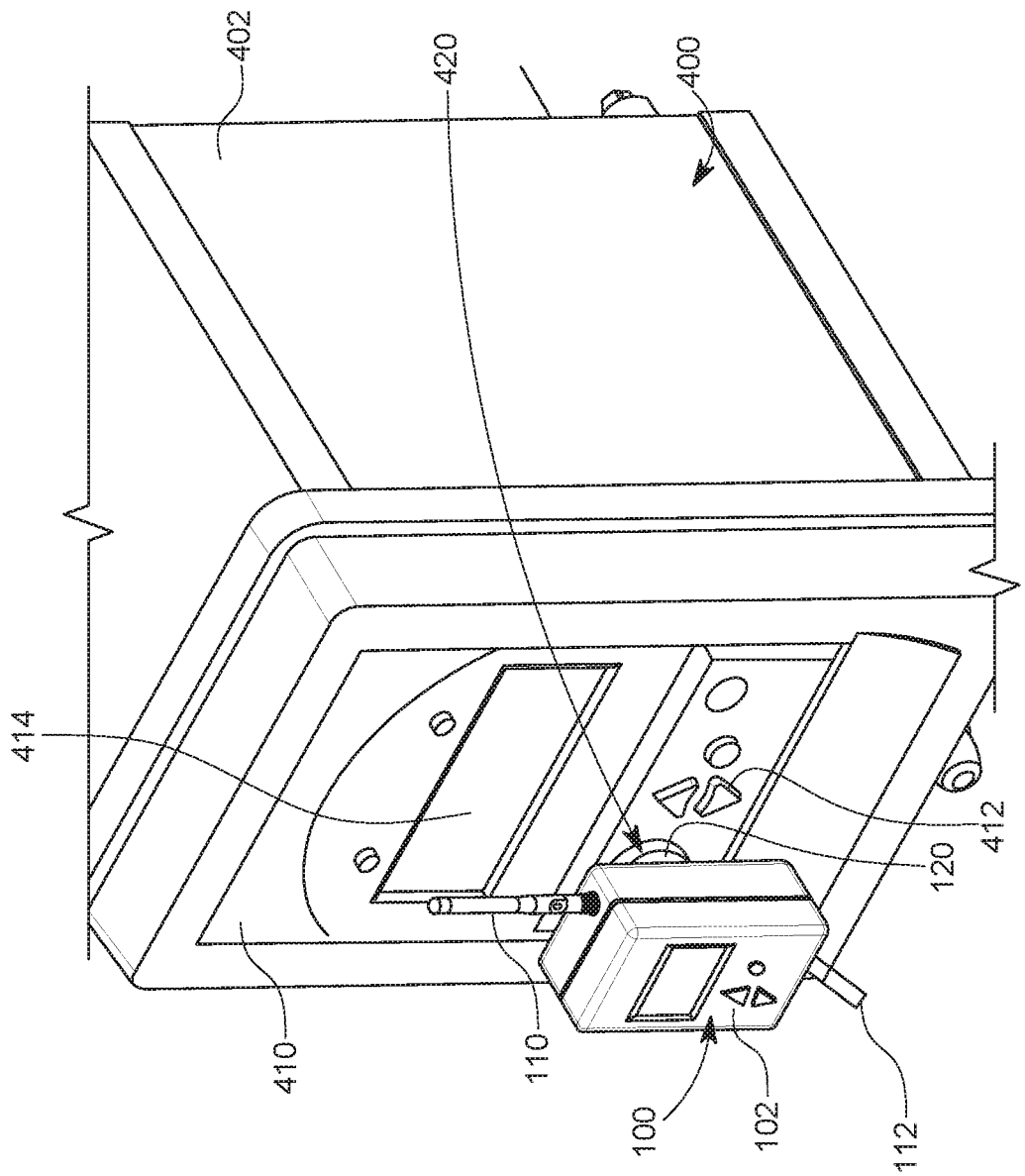
FIG. 4 illustrates a meter with a coupling device for coupling to the optical meter reader apparatus.

One or more magnets 150 are attached to the interior of the face 120A, as illustrated in FIG. 1A. If more than a magnet 150 is attached to the flat face 120A, a second magnet 152 may be placed diametrically opposite to the first magnet 150. The magnet or magnets are small but strong enough to maintain a tight mechanical contact between the face 120A and the coupling device, as shown in FIG. 4. FIG. 4 shows a meter 400 having a housing 402 that includes, among other things, a flat face 410. The flat face 410 may have various buttons 412 and a visual interface 414 (e.g., a display) that shows the amount of product (water, gas or electricity) used by the consumer where the meter 400 is mounted. A coupling device 420 can be seen being attached to the face 410 of the meter 400. The housing extension 120 of the optical meter reader apparatus 100 is magnetically attached to the coupling device 420 (with magnet 150) such that the entire optical meter reader apparatus 100 is removably attached to the meter 400.

Figure 5:
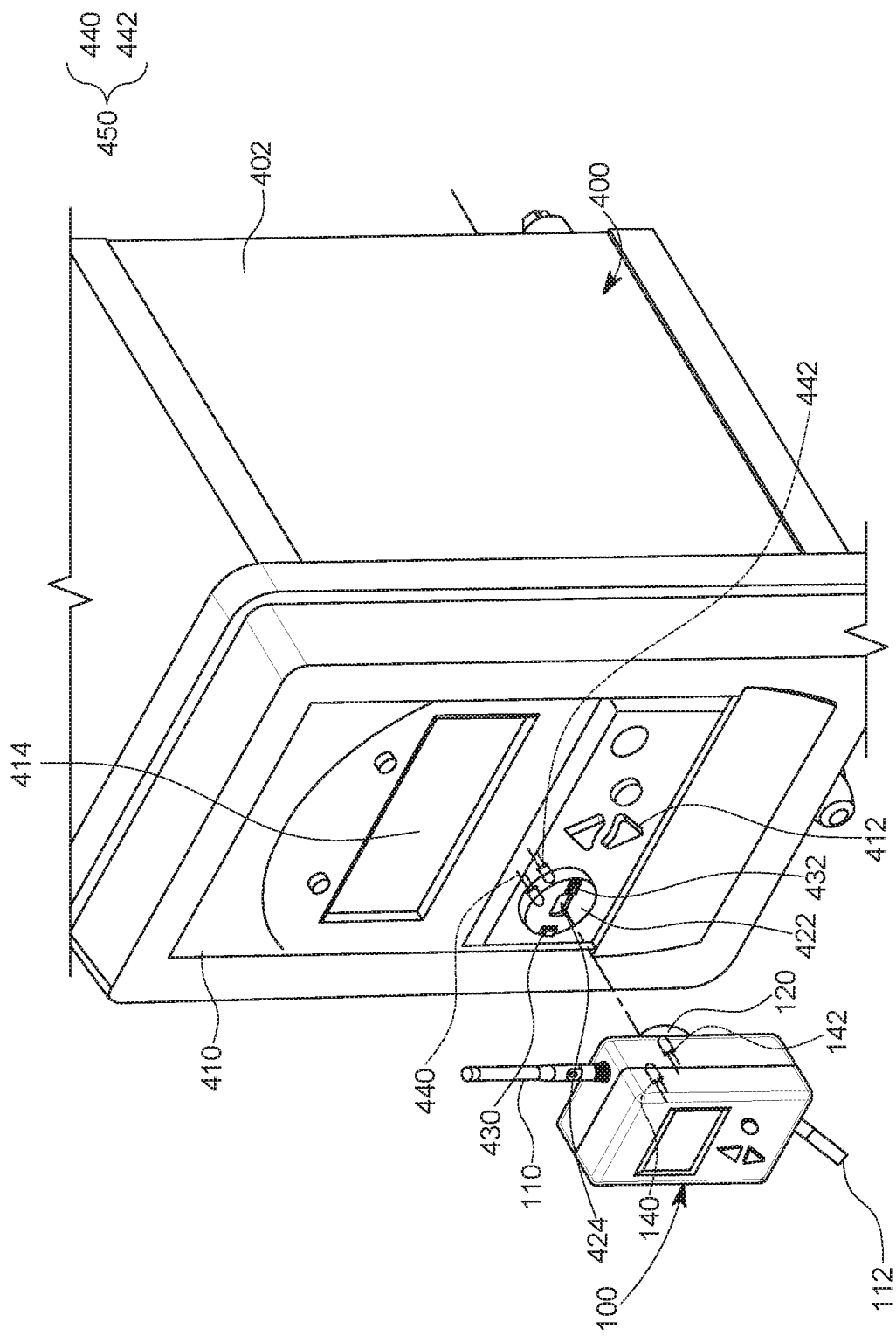
FIG. 5 illustrates the meter and the optical meter reader apparatus just before being coupled to each other.

The coupling device 420 is shown in more detail in FIG. 5, and it includes a metallic plate 422 that has the same number of blocks 430 and 432 as the number of slots 130 and 132. In other words, if the optical meter reader apparatus 100 has N slots, the coupling device 420 has N blocks, where N is a whole number equal to one or more. The blocks 430 and 432 are configured to project out from the face 410, so that these blocks can enter into the corresponding slots 130 and 132. The shape of the blocks 430 and 432 is selected to match the shape of the slots 130 and 132 so that each block of the coupling device tightly enters inside a corresponding slot of the extended housing 120.

The metallic plate 422 is made of a material that interacts with a magnet so that the magnet 150 from the housing extension 120 attaches to the metallic plate. In one application, it is possible that the blocks 430 and 432 are made of a magnetic material so that they are attracted to a metallic material from which the slots 130 and 132 are made, so that the magnet 150 may become optional. The metallic plate 422 is shown in FIG. 5 being circular and having a slot 424. Slot 424 is located so that the light emitting diode 140 and the photodiode 142 of the optical meter reader apparatus can directly interact with a corresponding photodiode 440 and a corresponding light emitting diode 442 that are housed inside the housing 402 of the meter 400. The photodiode 440 and the light emitting diode 442 form the optical communication device 450 of the meter 400.

Although the embodiments discussed herein use infrared light emitting diodes and photodiodes that work with infrared light, one skilled in the art would understand that other light frequencies may be used for achieving the optical communication between the optical meter reader apparatus and the meter. The infrared light is used in these embodiments only because the standard interface used by the utilities for their meters, defined in IEC62056-21 and ANSI C12.18, require an infrared interface. However, if this standard is changing in future, other optical frequencies may be equally applicable for these embodiments.

Figure 6:
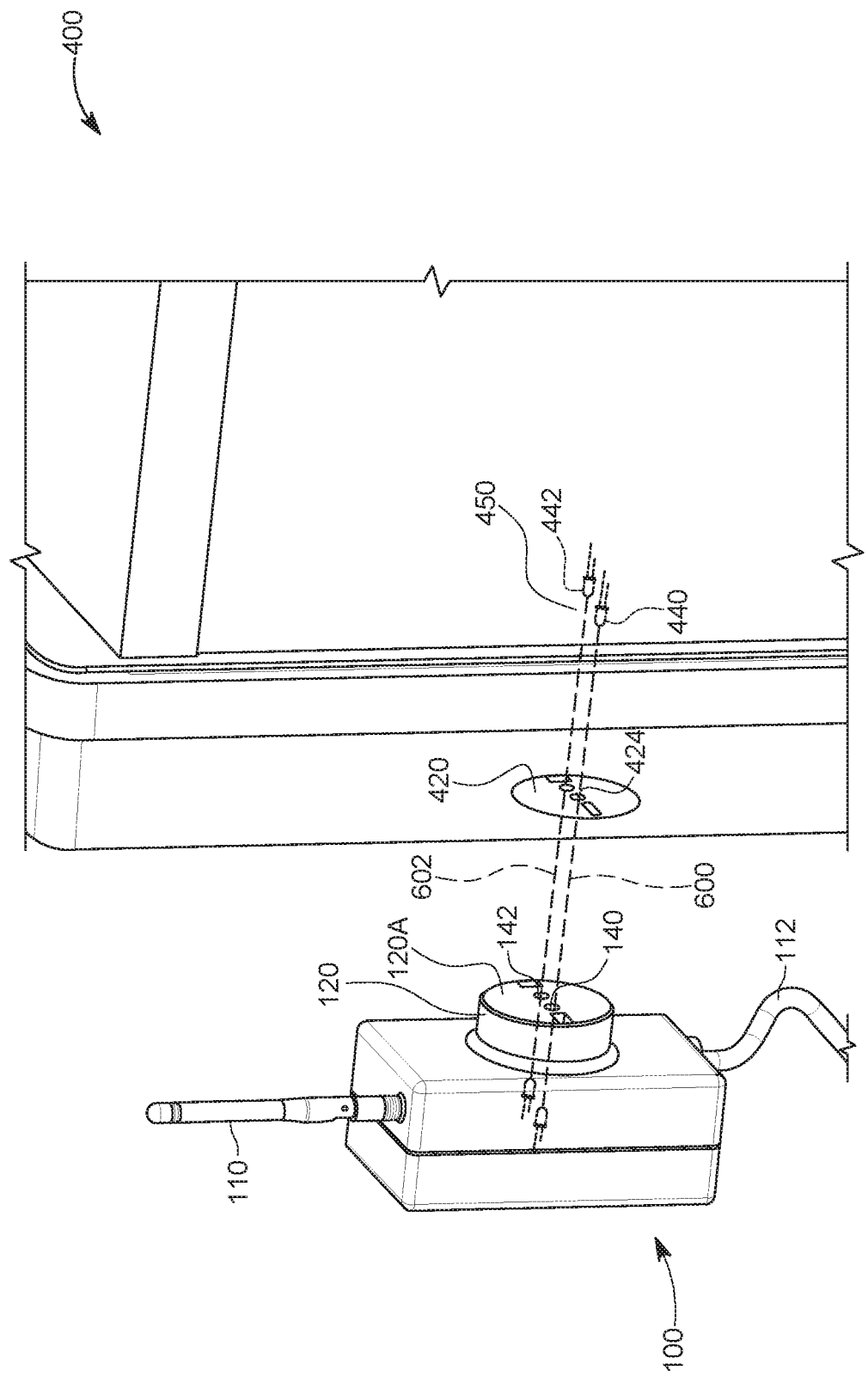
FIG. 6 illustrates the meter, the optical meter reader apparatus, and the infrared beams that are exchanged between the two elements.

In this regard, FIG. 6 shows the photodiode 440 receiving an infrared beam 600 from the corresponding light emitting diode 140 and the light emitting diode 442 sending an infrared beam 602 to the photodiode 142. The coupling device 420 may be attached to the face 410 of the housing 402 not only with magnets as previously discussed, but also with other means, for example, screws, glue, or it can be welded. For existing meters, the coupling device 420 may be added retroactively for supporting the optical meter reader apparatus 100.

Figure 7A:
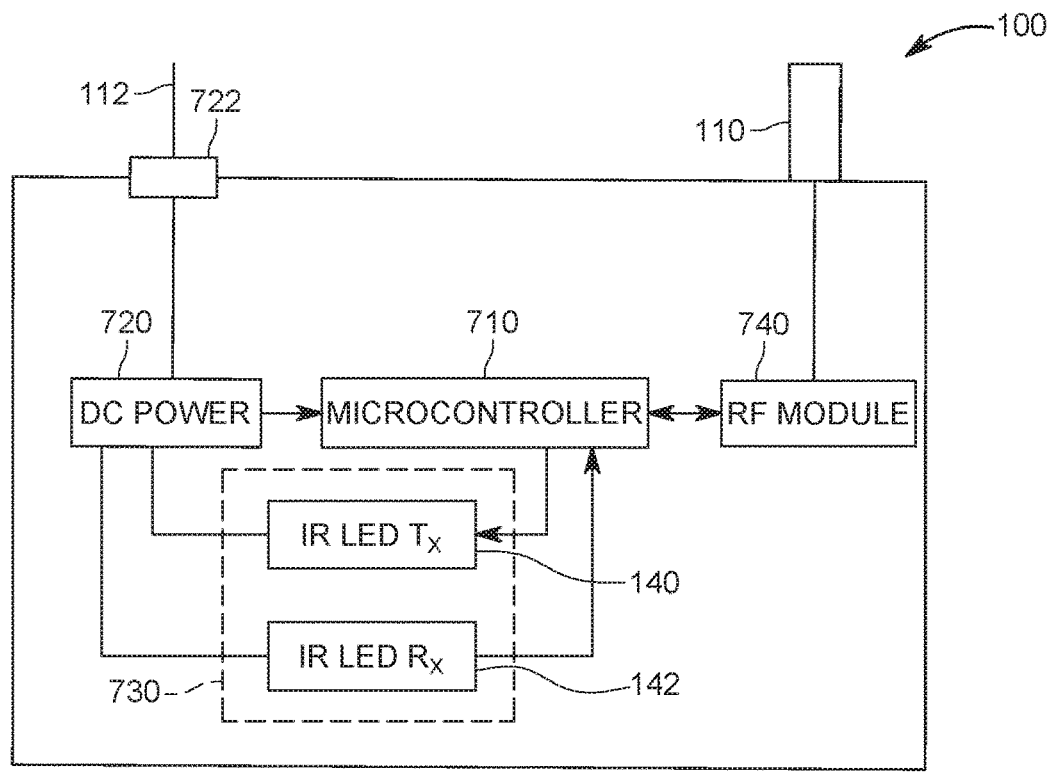
FIGS. 7A and 7B illustrate the electronics of the optical meter reader apparatus.
Figure 7B:
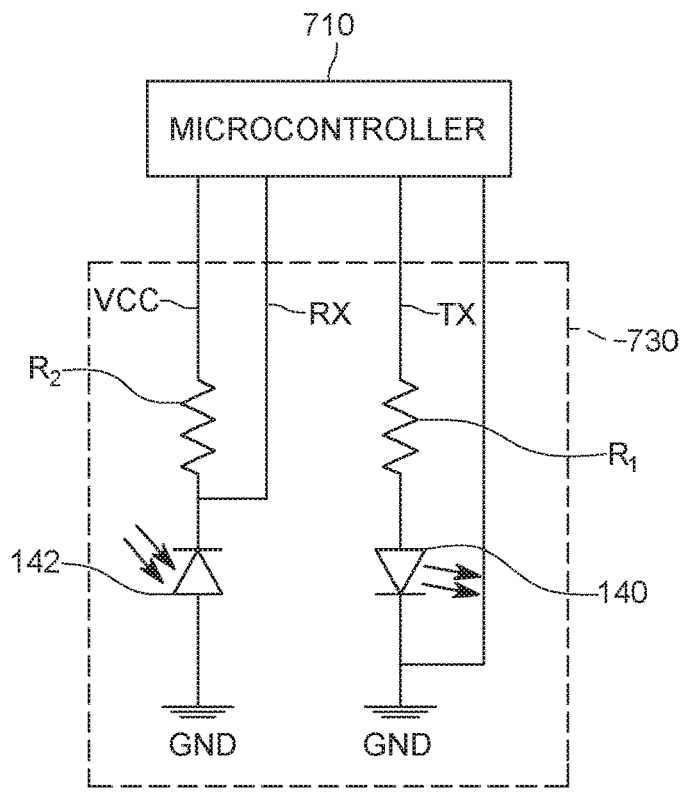

The optical meter reader apparatus 100 may include electronics as now discussed with regard to FIGS. 7A and 7B. FIG. 7A schematically shows various components and the electrical connections between them. A microcontroller 710 is the brain of the optical meter reader apparatus and is connected to the other components. A power module 720 provides power to the microcontroller 710 and to the other electronic components. The power module 720 may be a DC power module and may be implemented as a battery, solar cell, wind element, fuel cell, etc. The power module 720 may be connected, via an interface 722 to the electrical cable 112 so that power from the cable 112 is used by the microcontroller. In one embodiment, the power module 720 may include additional electronics for providing a constant current and/or voltage to the microcontroller. The power module 720 is also connected to the infrared light emitting diode 140 and to the photodiode 142 for powering the elements.

The microcontroller 710 is also electrically connected to an optical communication module 730, which includes the infrared light emitting diode 140 and the photodiode 142, and the microcontroller controls when these elements are active. For example, for preserving energy, the microcontroller can activate these two elements once a day, once a week, once a month, or for any desired time interval. While the microcontroller sends activation instructions to the infrared light emitting diode 140, the microcontroller receives measured signals from the photodiode 142. In one application, the microcontroller is configured to digitize the information received from the photodiode, perform some processing and then send this information to the radio frequency (RF) module 740, for being transmitted through antenna 110 to a server of the utility that owns the optical meter reader apparatus 100.

FIG. 7B shows an electrical diagram of the electronic components of the optical meter reader apparatus 100, where the infrared light emitting diode 140 is connected in series to a resistor R1 (e.g., R1=470Ω) for forming a transmitting circuit TX, and the photodiode 142 is connected in series to another resistor R2 (e.g., R2=330Ω) for forming a receiving circuit RX. Although FIG. 7B shows the light emitting element 140 and the light detecting element 142 as being implemented as diodes, one skilled in the art would understand that other elements (e.g., transistor) may be used for achieving these two elements.

The infrared light emitting diode 140 and the photodiode 142 act as a transmitter and receiver, respectively, when communicating with the counterpart infrared communication module 450 of the utility meter 400. The infrared transmitter 140 of the optical meter reader apparatus 100 is aligned opposite to the receiver 440 of the meter 400 and the receiver 142 of the optical meter reader apparatus 100 is aligned opposite to the infrared transmitter 442 of the meter 400.

The alignment between these transmitters and receivers needs to be precise and any deviation beyond a few millimeters will result in a communication error between the optical meter reader apparatus 100 and the meter 400. To avoid misalignment, the slots 130 and 132, as shown in FIG. 1A, fasten to the rectangular blocks 430 and 430 of the meter 400, as shown in FIG. 5. As the utility meter 400 usually does not contain these rectangular blocks, they are provided as part of the coupling device 420 to be attached onto the surface 410 of the meter 400. The perpendicular cohesive force between the magnets 150 in the optical meter reader apparatus 100 and the coupling device 420 of the meter 400 holds the optical meter reader apparatus 100 against the force of gravity. Slots 130 and 132 and blocks 430 and 432 further ensure that the optical meter reader apparatus 100 does not move/rotate due to vibration or gravitational force, relative to the meter 400.

Figure 8:
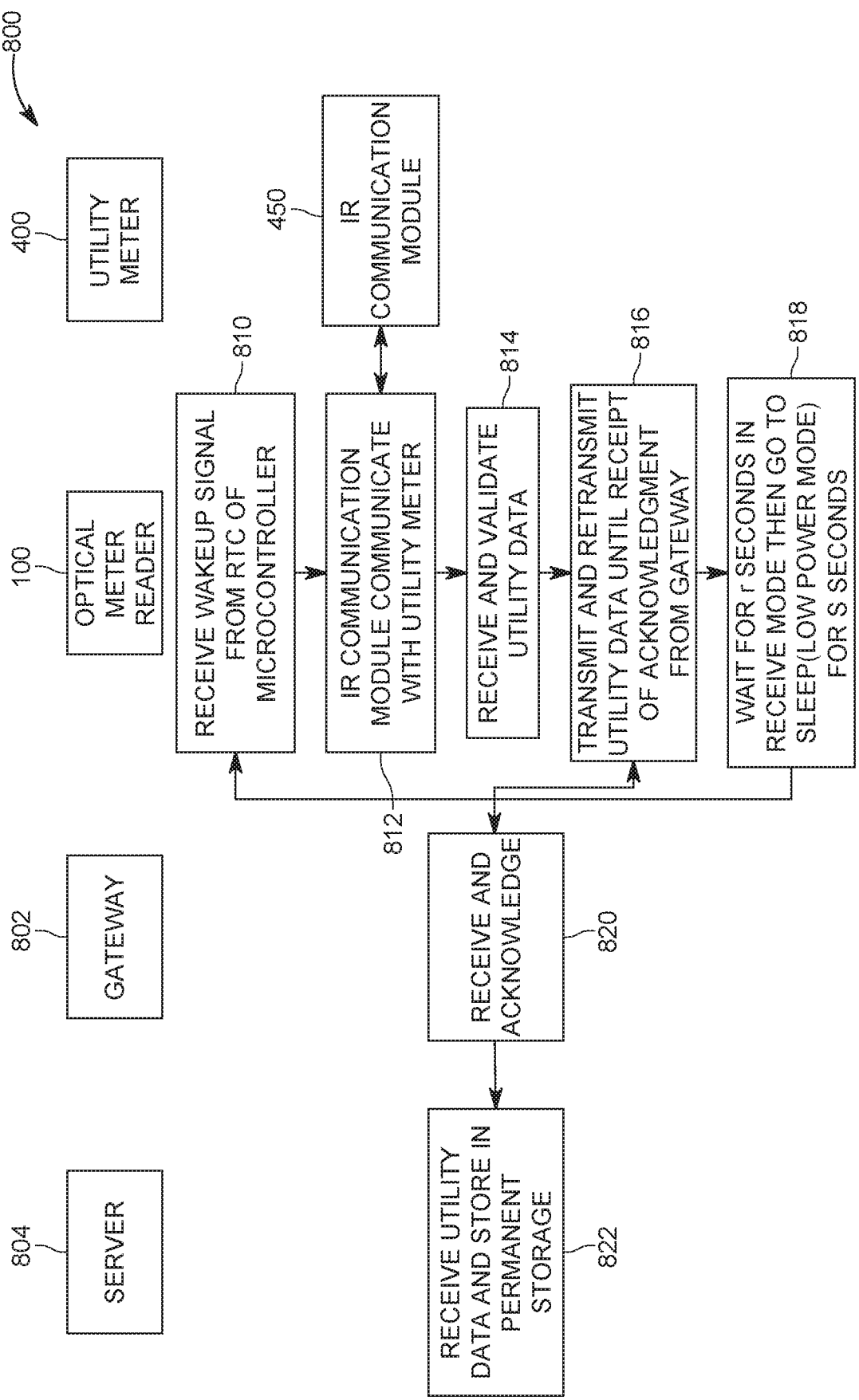
FIG. 8 illustrates a first mode of operation of the optical meter reader apparatus.

The optical meter reader apparatus 100 may operate in various modes for estimating the amount of product that is delivered by the utility and is being measured by the meter 400. According to a first mode, also called a mode A, the optical meter reader apparatus 100 is attached to the meter 400 and is in wireless communication with a gateway 802, as illustrated in FIG. 8. System 800 includes the utility meter 400, the optical meter reader apparatus 100, the gateway 802, and the server 804. The gateway 802 transmits the information received from the optical meter reader apparatus 100 to the server 804, that belongs to the utility. Gateway 802 may be implemented as an independent wireless communication device located about the premises where the optical meter reader apparatus 100 is installed. For example, the gateway 802 may be located on a pole (power utility pole), on a building or a communication tower. In one embodiment, the gateway 802 may be attached to the structure where the meter 400 is located. In still another embodiment, the gateway 802 may be located inside the structure where the meter is located, for example, may be a router inside that building.

A real time clock (RTC) of the microcontroller 710 of the optical meter reader apparatus 100, wakes up the optical meter reader apparatus 100 in step 810. This action may happen every n seconds, where n could be any number. In step 812, the optical communication module 730 of the optical meter reader apparatus 100 communicates with the optical communication module 450 of the reader 400, i.e., infrared light is exchanged between the optical communication modules for transferring information about the product being delivered by the utility, through the meter 400, to the consumer to which the meter 400 is installed. For example, if the utility is a power utility, the meter 400 measures the amount of electrical power that is being delivered by the power utility to the consumer, and the meter 400 records this wattage. The optical communication module 450 reads this information from the meter 400 and the optical communication module 730 of the optical meter reader apparatus 100 reads this information from the optical communication module 450 of the meter 400.

This information is received and validated by the microcontroller 710 in step 814, after which, the microcontroller instructs the RF module 740 to transmit this data, in step 816, to the gateway 802. This data is retransmitted to the gateway 802 until the gateway acknowledges in step 820 that the information has been received. The communication between the RF module 740 of the optical meter reader apparatus 100 and the gateway 802 is implemented as a long-range radio frequency modulation. The gateway 802 not only acknowledges to the optical meter reader apparatus 100 that the information has been received, but it also forwards in step 822 this information to a server 804 of the utility, where the data is permanently stored with a timestamp. Note that the communication between the gateway 802 and the server 804 may be wired or wireless.

If the optical meter reader apparatus 100 does not receive an acknowledgment in step 816 from the gateway 802, the optical meter reader apparatus 100 retransmits the same data to the gateway 802 after waiting for a given amount of time. The given amount of time may be random or predefined. The retransmission is repeated until the optical meter reader apparatus 100 receives an acknowledgment or after a selected number of attempts. After the acknowledgment is received, the RF module 740 of the optical meter reader apparatus 100 enters a listening mode for w seconds, where w can be any number. During this listening mode, any command can be sent by the server 804 or gateway 802 to the optical meter reader apparatus 100. After the w seconds, the optical meter reader apparatus 100 enters in step 818 a low power mode for s seconds, so that the RF module 740 (or radio) is turned off. The optical meter reader apparatus 100 wakes up from the low-power mode when the real-time clock triggers the completion of the s seconds and the steps discussed above are repeated.

Figure 9:
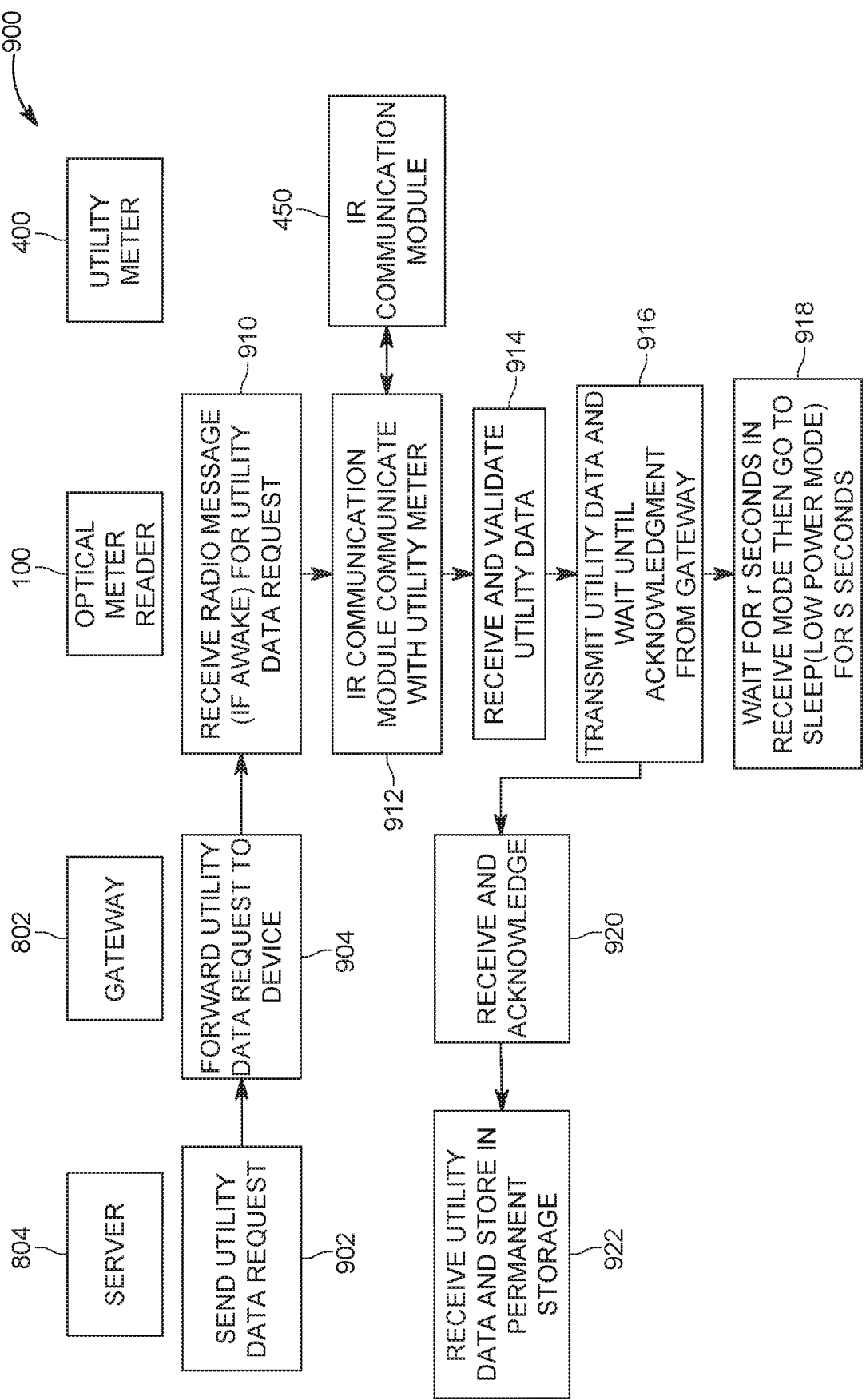
FIG. 9 illustrates a second mode of operation of the optical meter reader apparatus.

The optical meter reader apparatus 100 may also operate in a second mode, called herein mode C. In this mode, the configuration of the system 900, which includes the utility meter 400, the optical meter reader apparatus 100, the gateway 802, and the server 804, is shown in FIG. 9.

The real time clock of the microcontroller 710 of the optical meter reader apparatus 100 is not used in this implementation to automatically wake up the optical meter reader apparatus 100. Instead, the RF module 740 receives in step 910 a message from the server 804, through the gateway 802. The message is generated in step 902 at the server 804 and then forwarded in step 904 by the gateway 802 to the optical meter reader apparatus 100. In step 912, the optical communication module 730 of the optical meter reader apparatus 100 communicates with the optical communication module 450 of the reader 400, i.e., infrared light is exchanged between the optical communication modules for transferring information about the product being delivered by the utility, through the meter 400, to the consumer to which the meter 400 is installed. The optical communication module 450 reads this information from the meter 400 and the optical communication module 730 of the optical meter reader apparatus 100 reads this information from the optical communication module 450 of the meter 400.

This information is received and validated by the microcontroller 710 in step 914, after which, the microcontroller instructs the RF module 740 to transmit this data, in step 916, to the gateway 802. This data is retransmitted to the gateway 802 until the gateway acknowledges in step 920 that the information has been received. The communication between the RF module 740 of the optical meter reader apparatus 100 and the gateway 802 is implemented as a long-range radio frequency modulation. The gateway 802 not only acknowledges to the optical meter reader apparatus 100 that the information has been received, but it also forwards in step 922 this information to a server 804 of the utility, where the data is permanently stored with a timestamp. Note that the communication between the gateway 802 and the server 804 may be wired or wireless.

If the optical meter reader apparatus 100 does not receive an acknowledgment in step 916 from the gateway 802, the optical meter reader apparatus 100 retransmits the same data to the gateway 802 after waiting for a given amount of time. The given amount of time may be random or predefined. The retransmission is repeated until the optical meter reader apparatus 100 receives an acknowledgment or after a selected number of attempts. After the acknowledgment is received, the RF module 740 of the optical meter reader apparatus 100 returns to the continuous listening state and waits for a further request from the gateway 802. The optical meter reader apparatus 100 may enter in step 918 a low-power mode after waiting for r seconds, so that the RF module 740 (or radio) is turned off for s seconds. The optical meter reader apparatus 100 wakes up from the low-power mode after the s seconds and continues to listen in step 910 for any command from the gateway 802. When such a command is received in step 910, the steps discussed above are repeated.

Figure 10:
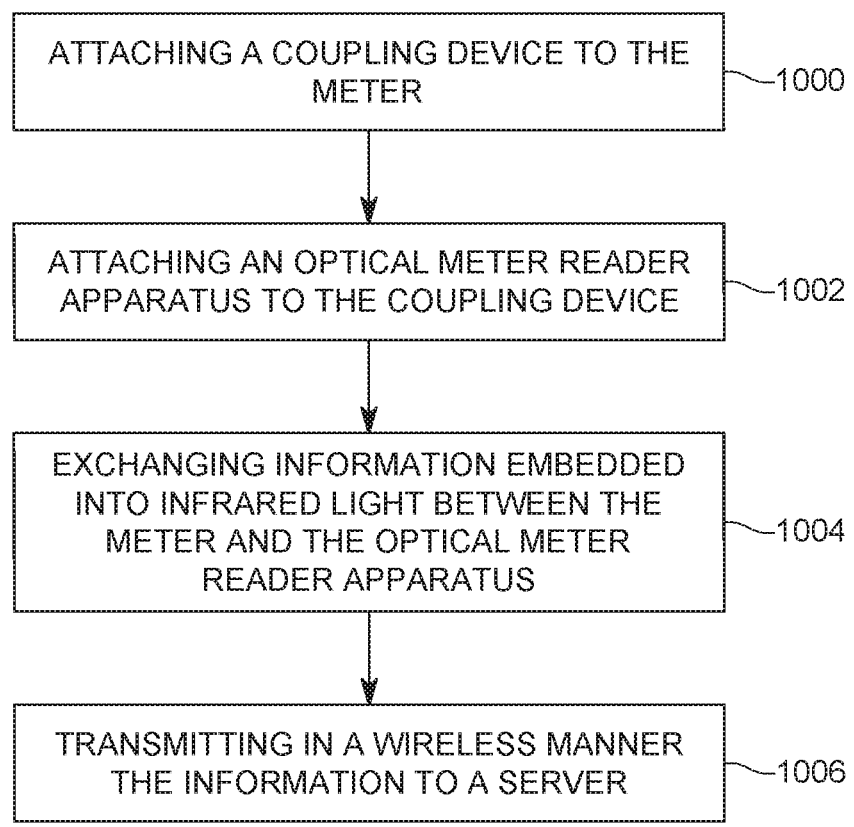
FIG. 10 is a flowchart of a method for reading information from a meter with an optical meter reader apparatus.

A method for collecting and transmitting information from a meter using an optical meter reader apparatus is now discussed with regard to FIG. 10. The method includes a step 1000 of attaching a coupling device 420 to the meter 400, a step 1002 of attaching the optical meter reader apparatus 100 to the coupling device 420, a step 1004 of exchanging information embedded into infrared light 600 between the meter 400 and the optical meter reader apparatus 100, and a step 1006 of transmitting in a wireless manner the information to a server. The coupling device includes one or more blocks and the optical meter reader apparatus includes one or more slots that accommodate the one or more blocks, respectively, so that the optical meter reader apparatus does not move relative to the meter.

The disclosed embodiments provide an optical meter reader apparatus that removably attaches to a meter and reads information from the meter. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. An optical meter reader apparatus for reading data from a meter, the optical meter reader apparatus comprising:
    a housing;
    a housing extension connected to the housing, the housing extension having a flat face;
    a first slot formed on the flat face;
    a second slot formed on the flat face;
    a first port formed on the flat face and configured to allow a first infrared wave to exit the housing extension;
    a second port formed on the flat face and configured to allow a second infrared wave to enter the housing extension; and
    an optical communication module located within the housing and the housing extension and configured to exchange information with the meter using the first and second infrared waves,
    wherein a longitudinal axis of the first slot is perpendicular to a longitudinal axis of the second slot.

2. The optical meter reader apparatus of claim 1, wherein the first and second slots are rectangular.

3. The optical meter reader apparatus of claim 1, wherein the first and second slots are located diametrically opposite to each other and the flat face is circular.

4. The optical meter reader apparatus of claim 1, wherein the optical communication module comprises:
    an infrared light emitting diode that emits the first infrared wave; and
    a photodiode that detects the data from the second infrared wave.

5. The optical meter reader apparatus of claim 4, further comprising:
    a microprocessor that is configured to control the infrared light emitting diode and to receive the data from the photodiode.

6. The optical meter reader apparatus of claim 5, further comprising:
    a radio-frequency module that transmits the data in a wireless manner.

7. The optical meter reader apparatus of claim 6, further comprising:
    an antenna attached to the housing and electrically connected to the radio-frequency module.

8. The optical meter reader apparatus of claim 7, further comprising:
    a power source.

9. A system for reading information from a meter and transmitting the information to a server, the system comprising:
    a meter configured to estimate an amount of a product delivered by an utility through the meter;
    a coupling device attached to a face of the meter; and
    an optical meter reader apparatus for reading the information from the meter,
    wherein the optical meter reader apparatus has a housing and a housing extension, and the housing extension is detachably attached to the coupling device,
    wherein the housing extension is configured to exchange no electrical current with the coupling device, and
    wherein the optical meter reader apparatus further comprises:
    the housing;
    the housing extension connected to the housing, the housing extension having a flat face;
    the first slot formed on the flat face;
    the second slot formed on the flat face;
    a first port formed on the flat face and configured to allow a first infrared wave to exit the housing extension;
    a second port formed on the flat face and configured to allow a second infrared wave to enter the housing extension; and
    an optical communication module located within the housing and the housing extension and configured to exchange the information with the meter using the first and second infrared waves.

10. The system of claim 9, wherein the coupling device comprises:
    a metallic plate attached to the face of the meter, the metallic plate having a slot that allows an optical communication module of the meter to freely exchange an infrared beam with the optical meter reader apparatus.

11. The system of claim 10, wherein the metallic plate has first and second blocks that fit inside first and second slots of the optical meter reader apparatus.

12. The system of claim 9, wherein the first and second slots and the first and second blocks are rectangular.

13. The system of claim 9, wherein a longitudinal axis of the first slot is perpendicular to a longitudinal axis of the second slot.

14. The system of claim 9, wherein the first and second slots are located diametrically opposite to each other and the flat face is circular.

15. The system of claim 9, wherein the optical communication module of the optical meter reader apparatus comprises:
   an infrared light emitting diode that emits the first infrared wave; and
   a photodiode that detects the information from the second infrared wave.

16. The system of claim 15, wherein the optical meter reader apparatus further comprises:
   a microprocessor that is configured to control the infrared light emitting diode and to receive the information from the photodiode;
   a radio-frequency module that transmits the information in a wireless manner;
   an antenna attached to the housing and electrically connected to the radio-frequency module; and
   a power source connected to the meter.

17. The system of claim 9, wherein the optical meter reader apparatus further comprises:
   a magnet attached on a back of the flat face, the magnet being configured to establish mechanical contact between the flat face and the coupling device.

18. A method for collecting and transmitting information from a meter, the method comprising:
   attaching a coupling device to the meter;
   attaching a housing extension of an optical meter reader apparatus to the coupling device, wherein the optical meter reader apparatus has a housing and the housing extension;
   exchanging information embedded into infrared light between the meter and the optical meter reader apparatus through first and second ports formed in a flat face of the housing extension; and
   transmitting in a wireless manner the information from the optical meter reader apparatus to a server,
   wherein the coupling device includes one or more blocks and the housing extension of the optical meter reader apparatus includes one or more slots that accommodate the one or more blocks, respectively, so that the optical meter reader apparatus does not move relative to the meter, and
   wherein a longitudinal axis of a first slot of the one or more slots is perpendicular to a longitudinal axis of a second slot of the one or more slots.

* * * * *